(12) United States Patent
Shaffer et al.

(10) Patent No.: US 7,539,127 B1
(45) Date of Patent: May 26, 2009

(54) SYSTEM AND METHOD FOR RECOVERING FROM ENDPOINT FAILURE IN A COMMUNICATION SESSION

(75) Inventors: Shmuel Shaffer, Palo Alto, CA (US); Arijit Mukherji, Sunnyvale, CA (US); Labhesh Patel, Mountain View, CA (US); Rohit Dewan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1039 days.

(21) Appl. No.: 10/016,867

(22) Filed: Dec. 13, 2001

(51) Int. Cl.
H04L 12/26 (2006.01)

(52) U.S. Cl. ..................... 370/216; 370/221

(58) Field of Classification Search ............... 370/218, 370/221, 248, 244, 217; 379/22.03, 221.03
See application file for complete search history.

(56) References Cited

U.S. PATENT DOCUMENTS

| | | | |
|---|---|---|---|
| 5,590,177 A | 12/1996 | Vilmur et al. ............ 379/60 |
| 5,805,691 A * | 9/1998 | Dendi ................ 379/221.01 |
| 5,832,196 A * | 11/1998 | Croslin et al. ............... 714/4 |
| 5,995,830 A | 11/1999 | Amin et al. ................ 455/423 |
| 6,343,216 B1 | 1/2002 | Kim et al. ................ 455/450 |
| 6,404,741 B1 * | 6/2002 | Buhler et al. ............ 370/244 |
| 6,445,918 B1 | 9/2002 | Hellander ............ 455/423 |
| 6,493,552 B1 | 12/2002 | Hicks ................ 455/435 |
| 6,498,779 B1 * | 12/2002 | Michaud et al. .......... 370/227 |
| 6,535,517 B1 * | 3/2003 | Arkko et al. ............ 370/401 |
| 6,590,868 B2 * | 7/2003 | Shen ..................... 370/242 |
| 6,609,213 B1 * | 8/2003 | Nguyen et al. ............. 714/4 |
| 6,633,760 B1 | 10/2003 | Ham et al. ............ 455/422 |
| 6,667,962 B1 | 12/2003 | Lee et al. .............. 370/335 |
| 6,671,883 B1 * | 12/2003 | Rahman ................ 725/123 |
| 6,674,713 B1 * | 1/2004 | Berg et al. ............. 370/217 |
| 6,700,901 B1 * | 3/2004 | Shaffer et al. ........... 370/466 |
| 6,785,223 B1 * | 8/2004 | Korpi et al. ............ 370/218 |
| 6,810,247 B1 | 10/2004 | Halpern ............... 455/423 |
| 6,853,714 B2 * | 2/2005 | Liljestrand et al. ..... 379/201.03 |
| 6,912,276 B1 * | 6/2005 | Olafsson et al. ........ 379/93.35 |
| 6,934,247 B2 | 8/2005 | Bhattal et al. ........... 370/216 |
| 6,968,186 B2 | 11/2005 | Pittampalli et al. ...... 455/422.1 |
| 7,023,876 B2 * | 4/2006 | Berry et al. ............. 370/465 |
| 7,085,805 B1 * | 8/2006 | Ruberg et al. ............ 709/203 |
| 2001/0043561 A1 * | 11/2001 | Burns et al. ............ 370/216 |
| 2002/0026515 A1 * | 2/2002 | Michielsens et al. ........ 709/227 |
| 2003/0035425 A1 * | 2/2003 | Abdollahi et al. .......... 370/392 |
| 2003/0061319 A1 * | 3/2003 | Manzardo ............. 709/221 |
| 2003/0081556 A1 * | 5/2003 | Woodall ............... 370/241 |

* cited by examiner

*Primary Examiner*—William Trost, IV
*Assistant Examiner*—Toan D Nguyen
(74) *Attorney, Agent, or Firm*—Baker Botts L.L.P.

(57) ABSTRACT

A method for recovering a communication session after failure of an endpoint includes establishing a communication session between a first endpoint and a second endpoint, receiving keep alive signals from the first endpoint, detecting an interruption in the keep alive signals, and transferring the communication session with the second endpoint from the first endpoint to a third endpoint. A network device includes an interface that receives keep alive signals from a first endpoint in a communication with a second endpoint, and also includes a process or service that detects an interruption in the keep alive signals and transfers the communication session with the second endpoint from the first endpoint to a third endpoint.

35 Claims, 2 Drawing Sheets

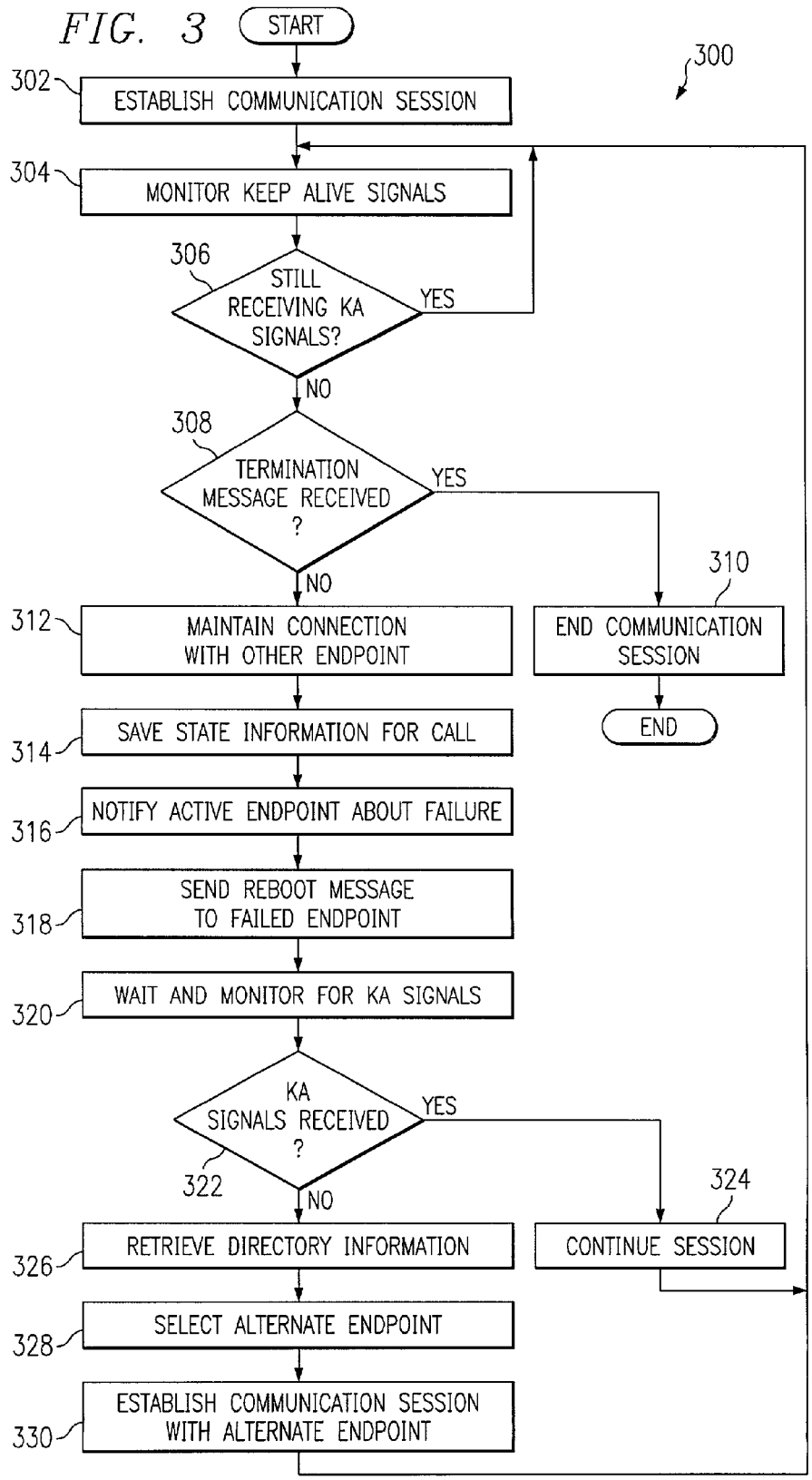

SYSTEM AND METHOD FOR RECOVERING FROM ENDPOINT FAILURE IN A COMMUNICATION SESSION

TECHNICAL FIELD OF THE INVENTION

This invention relates generally to the field of packet-based communication networks, and more particularly to a system and method for recovering from endpoint failure in a communication session.

BACKGROUND OF THE INVENTION

Historically, telecommunications have involved the transmission of voice and fax signals over a network dedicated to telecommunications, such as the public switched telephone network (PSTN) or a private branch exchange (PBX). Currently, telecommunications and data transmission are being merged into an integrated communication network using technologies such as voice over Internet protocol (VoIP). Earlier communication technology involved devices with relatively limited capabilities, and because of their simplicity, these devices rarely failed. Furthermore, when the devices did fail, it was a relatively simple process to reestablish connections. However, as telecommunication systems have become more complex and the capabilities of communication devices have increased, failure in communication devices has become more and more common.

SUMMARY OF THE INVENTION

The present invention includes a system and a method for recovering from endpoint failure in a communication session that substantially reduce or eliminate disadvantages or problems associated with previously developed systems and methods. In particular, certain embodiments of the present invention allow a connection between endpoints to be automatically reestablished or transferred in the case of endpoint failure, reducing complications associated with endpoint failure.

In accordance with a particular embodiment of the present invention, a method for recovering a communication session after failure of an endpoint includes establishing a communication session between a first endpoint and a second endpoint, and receiving keep alive signals from the first endpoint. The method also includes detecting an interruption in the keep alive signals, and maintaining a connection with the second endpoint after the interruption. The method further includes reestablishing the communication session if the first endpoint becomes available again.

In accordance with another embodiment of the present invention, a server includes an interface operable to receive keep alive signals from a first endpoint in a communication session with a second endpoint. The server also includes a process or service operable to detect an interruption in the keep alive signals, and to maintain a connection with the second endpoint after the interruption. The process or service also reestablishes the communication session with the first endpoint if the first endpoint becomes available again.

In accordance with yet another embodiment of the present invention, a method for recovering a communication session after failure of an endpoint includes establishing a communication session between a first endpoint and a second endpoint, and receiving keep alive signals from the first endpoint. The method also includes detecting an interruption in the keep alive signals, maintaining a connection with the second endpoint, and transferring the communication session with the second endpoint from the first endpoint to a third endpoint. Another embodiment of the present invention includes a server with an interface and a process or service. The interface receives keep alive signals from a first endpoint in a first communication session with a second endpoint. The process or service detects an interruption in the keep alive signals, maintains a connection with the second endpoint, and transfers the communication session with the second endpoint from the first endpoint to a third endpoint.

Technical advantages of certain embodiments of the present invention include a method for automatically reestablishing a communication session after endpoint failure. This reduces the difficulty associated with reestablishing a lost connection manually. Another technical advantage of certain embodiments of the present invention is the ability to automatically establish a connection with an alternate endpoint associated with a user of a failed endpoint. This allows communication to continue even when one endpoint associated with the user has failed. By providing a fail-over mechanism to address endpoint failure, the reliability of packet-based communication networks is increased.

Yet another technical advantage of certain embodiments of the present invention includes the ability to transfer a caller to a voice mail system, if an endpoint with which the user is communicating fails. This allows the user to leave a message for another user which can be retrieved after failure of the endpoint.

Still another technical advantage of certain embodiments of the present invention includes a system and method for automatically resetting an endpoint that is experiencing problems. By pressing a reset button associated with an endpoint, a user can initiate recovery procedures to preserve the communication session. Accordingly, such recovery procedures may be manually initiated by a user who detects problems with an endpoint.

Numerous other technical advantages will be readily apparent to one skilled in the art from the following figures, descriptions, and claims. Particular embodiments of the present invention may include some, all, or none of the advantages described.

BRIEF DESCRIPTION OF THE DRAWINGS

For a more complete understanding of the present invention and its advantages, reference is now made to the following description, taken in conjunction with the accompanying drawings, in which:

FIG. 3 is a flowchart illustrating a method for recovering from failure of an endpoint in a communication session, in accordance with another embodiment of the present invention.

DETAILED DESCRIPTION OF THE INVENTION

Figure 1:
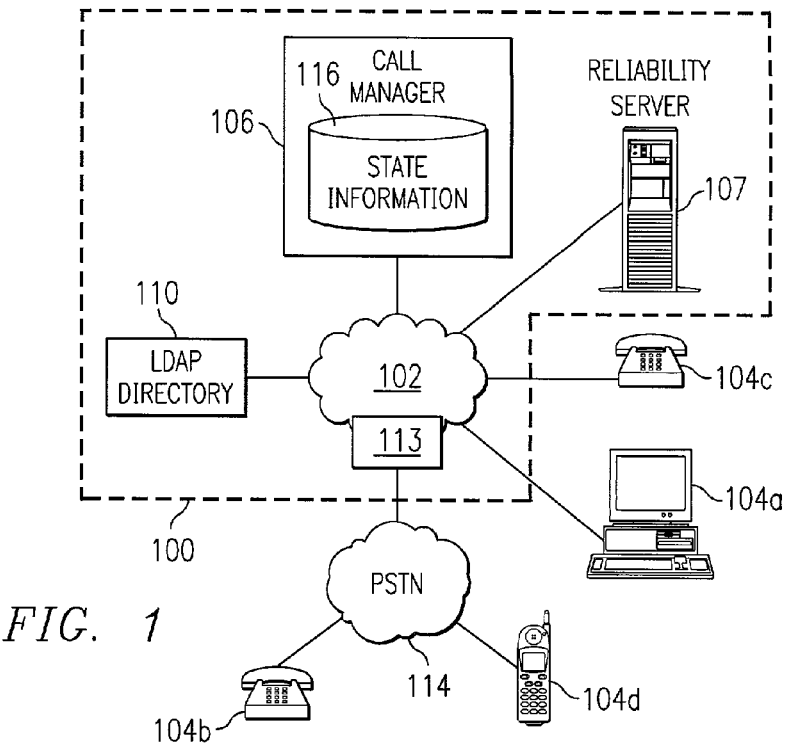
FIG. 1 illustrates a communication system capable of recovering from endpoint failure in a communication session, in accordance with a particular embodiment of the present invention.

FIG. 1 illustrates a communication system 100 that includes endpoints 104 that exchange audio, video, data or other information (generally referred to as "media") using network 102. System 100 includes a call manager 106, a Light Directory Access Protocol (LDAP) directory 110, and a reliability server 107 that communicate using network 102. System 100 preserves communication sessions after failure of an endpoint 104 by transferring or reestablishing the communication session after the endpoint 104 fails.

During a communication session between two endpoints 104, reliability server 107 receives keep alive signals from at least one of the endpoints. If reliability server 107 detects failure of an endpoint 104, reliability server 107 will instruct the call manager to maintain a connection with the other active endpoint 104, and take corrective action to maintain the communication session. In accordance with a particular embodiment, reliability server 107 initiates a reboot of the failed endpoint 104. A prerecorded message may be delivered to the active endpoint 104 indicating that the failed endpoint 104 is experiencing problems. If reliability server 107 detects that the failed endpoint 104 has successfully rebooted, the active endpoint 104 is reconnected with the previously failed endpoint 104, and the communication session continues.

In another embodiment, reliability server 107 attempts to transfer the communication session with the active endpoint 104 to another endpoint 104 associated with the user of the failed endpoint 104. For example, the user of the failed endpoint 104 may have access to a mobile or cellular phone. Reliability server 107 identifies the alternate endpoint 104 and transfers the communication session with the active endpoint 104 from the failed endpoint 104 to the alternate endpoint 104. According to a particular embodiment, reliability server 107 accesses LDAP directory 110 to identify the alternate endpoint 104, which is associated with a user of the failed endpoint 104.

Network 102 refers generally to any network capable of transmitting media between endpoints 104. Network 102 may be a local area network (LAN), wide area network (WAN), global distributed network such as the Internet, Intranet, or Extranet, or any other form of wireless or wireline communication network. Generally, network 102 provides for the communication of packets, cells, frames, or other portions of information (generally referred to as packets) between endpoints 104. Network 102 may include any combination of gateways, routers, hubs, switches, and any other hardware and/or software implementing any number of communication protocols that allow for the exchange of packets in system 100. Network 102 may be coupled to non-packet-based networks, such as the public switched network (PSTN) 114, using a gateway 113. Network 102 may use any suitable protocol including Internet protocol (IP), frame relay, asynchronous transfer mode (ATM), synchronous optical network (SONET), or any other suitable protocol for carrying information.

Endpoints 104 may be any combination of hardware and/or software that provide communication services to a user. For example, endpoints 104 may be telephones, computers running telephony software, video monitors, cameras, or any other communication or processing hardware, software and/or embedded logic that supports communication of information, and is capable of coupling to network 102 or PSTN 114. Endpoints 104 may also include cellular phones, wireless phones, unattended or automated systems, gateways, multi-point control units (MCUs), interactive voice response servers (IVRs), other intermediate components, or other devices that can establish media sessions. Although FIG. 1 illustrates a particular number of endpoints 104, system 100 contemplates any number and arrangement of endpoints 104 in network 102.

Endpoints 104 exchange media in communication sessions. The term "communication session" refers to any connection between endpoints 104 allowing exchange of media. One of the endpoints 104 may fail during a communication session because of software errors, memory overloads, power failures or any number of other conditions that prevent endpoint 104 from communicating media. System 100 can preserve a communication session with one of the endpoints 104 if another endpoint 104 in the communication session fails.

Call manager 106 represents any combination of hardware and/or software for managing communications between endpoints 104 over network 102. Call manager 106 may perform any manner of call processing, including assignment of bandwidth, establishing connections between endpoints 104, redirecting calls within network 102, and any other suitable form of call management. Call manager 106 also manages state information 116. State information 116 represents the progress of calls managed by call manager 106, so that if a communication is interrupted, call manager 106 can reestablish the connection using state information 116.

Although the depicted embodiment shows call manager 106 as a separate component, the functions of call manager 106 may be distributed among other components of system as well. Accordingly, certain embodiments of system 100 may be adapted to use peer-to-peer protocols, such as Session Initiation Protocol (SIP) or H.323, that allow endpoints 104 in network 102 to negotiate point-to-point communication sessions managed by endpoints 104 themselves rather than a separate call manager 106. In such embodiments, call manager 106 represents a collection of call management functions performed by various components of system 100.

LDAP directory 110 stores a directory of customized information about user(s), such as alternate phone numbers associated with the user(s). In a particular embodiment, information in directory 110 is stored so that components of system 100 can access directory 110 using LDAP. However, various types of directories may be used, and various types of protocols may be used to communicate with such directories to extract information therefrom. It should be understood that directory 110 information may be stored and accessed in any appropriate manner. Therefore, when a reference is made to LDAP directory 110, such a reference is intended to encompass other suitable variations as well.

Reliability server 107 monitors endpoints 104 for failure and recovers a communication session after one of the endpoints 104 in the communication session fails. Reliability server 107 may be embodied as hardware and/or software, and the functions of reliability server 107 may be performed by one or distributed amongst more than one component of network 102, such as call manager 106, personal assistant 110, or any other suitable local or remote component.

In operation, call manager 106 receives a request from endpoint 104a to establish a call. Call manager 106 establishes a connection between endpoint 104a and destination endpoint 104b.

During the communication session, endpoints 104 send keep alive signals to reliability server 107. Keep alive signals, also known as heartbeats, include any form of information sent periodically to reliability server 107 that indicates to reliability server 107 that endpoint 104 is still active, and may include responses to ping messages sent by reliability server 107. In an Internet protocol (IP) network, keep alive signals may be communicated using a suitable protocol, such as transport control protocol (TCP) or User Datagram Protocol (UDP), in the form of appropriate signaling information.

Reliability server 107 monitors the communication session for an interruption in keep alive signals. If an interruption is detected, reliability server 107 may determine whether the interruption was due to voluntary disconnection rather than endpoint 104 failure by monitoring the communication session for disconnect signals, such as endpoint 104 going to an "on-hook" state. In certain embodiments of system 100, keep alive signals are sent by endpoint 104 even after the call is disconnected. In a particular embodiment, reliability server 107 registers an interruption only when a significant number of keep alive signals are missed, so that occasional packet loss is not mistaken for endpoint 104 failure. If reliability server 107 determines that the interruption in keep alive packets resulted from endpoint 104 failure, reliability server 107 maintains the connection with endpoint 104b, and either transfers the communication session to another endpoint 104c or reestablishes the communication session with the original endpoint 104a.

To transfer the communication session, reliability server 107 identifies an alternate endpoint 104c associated with the user of failed endpoint 104a, usually by consulting LDAP directory 110. Alternate endpoint 104c may be a mobile or cellular telephone, a landline telephone, a voice mail system, or any other suitable endpoint associated with the user of the failed endpoint 104a. A particular user may be associated with multiple alternate endpoints 104a, each of which may be selected under different conditions. For example, during business hours, reliability server 107 selects an office phone, but after hours, it selects a home phone. In another example, failed endpoint 104a is a computer located in an office, and alternate endpoint 104c is a landline telephone in the office.

Once reliability server 107 identifies alternate endpoint 104c, reliability server 107 transfers the communication session with active endpoint 104b to alternate endpoint 104c. In a particular embodiment, reliability server 107 transfers the communication session by instructing call manager 106 to establish a communication session between active endpoint 104b and alternate endpoint 104c. The entire transfer can be performed automatically without input from the user of active endpoint 104b, thereby saving time and effort associated with manually reconnecting. System 100 may facilitate the transfer by carrying over state information 116 from the previous communication session between endpoints 104a and 104b. For example, if call manager had been instructed to block call waiting for failed endpoint 104a, it could carry over the instruction and block call waiting for alternate endpoint 104c as well.

In a particular embodiment, system 100 transfers active endpoint 104b to a voice mail system. The user of active endpoint 104b may then complete the conversation by recording a message or may leave information that allows the user of failed endpoint 104a to reestablish communication with active endpoint 104b. This feature is particularly useful when the user of failed endpoint 104a does not have sufficient information to reestablish the connection, such as when the user of failed endpoint 104a does not know the phone number of active endpoint 104b. In such cases, only the user of active endpoint 104b can attempt to reestablish the connection, but that user has no way of knowing when failed endpoint 104a will reactivate. As a result, the user often makes several failed attempts to reestablish the connection before failed endpoint 104a recovers. System 100 creates a better alternative by allowing the user of active endpoint 104b to provide contact information to the user of failed endpoint 104a, who can then attempt to reestablish the connection after failed endpoint 104a reactivates itself or call endpoint 104b from another endpoint 104.

As an alternative to immediately transferring the communication session, reliability server 107 may attempt to reactivate failed endpoint 104a and reestablish the communication session with failed endpoint 104a. To reactivate endpoint 104a, reliability server 107 sends a message to call manager 106 or to endpoint 104a instructing endpoint 104a to reboot. Reliability server 107 then waits for a predetermined amount of time to see if failed endpoint 104a successfully reactivates. While reliability server 107 waits for failed endpoint 104a to reactivate, reliability server 107 may send a message indicating to the user of active endpoint 104b that endpoint 104a has failed and that system 100 is attempting to reestablish the connection. If endpoint 104a successfully reactivates, reliability server 107 reestablishes the communication session between endpoints 104a and 104b. Otherwise, reliability server 107 identifies a suitable alternate endpoint 104c, and transfers the connection.

Certain embodiments allow system 100 to conserve system 100 resources by restricting the circumstances in which recovery techniques will be applied. In one such embodiment, system 100 uses a priority system that assigns a higher priority to particular communication sessions, users, and/or endpoints 104. If endpoint 104 fails during a high-priority communication session, reliability server 107 recovers the session. If, on the other hand, endpoint 104 fails during a lower-priority communication session, then the communication session may be terminated and require manual reestablishment.

Other embodiments allow a user to manually trigger reliability server 107 to transfer the communication session to another endpoint 104. In one such embodiment, endpoint 104 interrupts the keep alive signals when the user of endpoint 104 presses a reset button. In another such embodiment, pressing the reset button sends a message to reliability server 107 to transfer the connection without interrupting the keep alive signals. In response, reliability server 107 automatically transfers the communication connection to the alternate endpoint 104. This feature is useful in cases where the performance of endpoint 104 degrades and the user desires a higher quality connection and wishes to transfer a call to an alternate endpoint 104 to obtain a better connection. Accordingly, a user has the option to manually reset an endpoint to allow system 100 to reset the endpoint and/or identify an alternate endpoint if the user is experiencing a "bad connection" (e.g., static, background noise, echo, etc.). The user can reset endpoint 104 before reliability server 107 detects trouble and can trigger a reset even when reliability server 107 would not otherwise treat the problems in the connection as endpoint 104 failure.

The depicted components of system 100 may be modified in various ways without substantially affecting the overall operation of system 100. The functions of the components may be distributed in system 100 or consolidated with other elements. Each component may be embodied as hardware, software, or any combination of the two, including any number and variety of processors, interfaces and memory modules. The processors may be any process or service for processing information, and may include microprocessors, microcontrollers, digital signal processors (DSPs), or any other suitable hardware or software configured to process information, such as logic embodied on a computer readable medium. The interfaces may include any port or connection, whether real or virtual, that allows components to communicate with network 102. The memory modules may include volatile or non-volatile memory, magnetic media, optical media, CD-ROMs, DVD-ROMs, or any other suitable local or remote media component. Because of the numerous possible variations on system 100, system 100 should be viewed example of a system that recovers communication sessions after endpoint failure, rather than as an exclusive definition of such a system.

Figure 2:
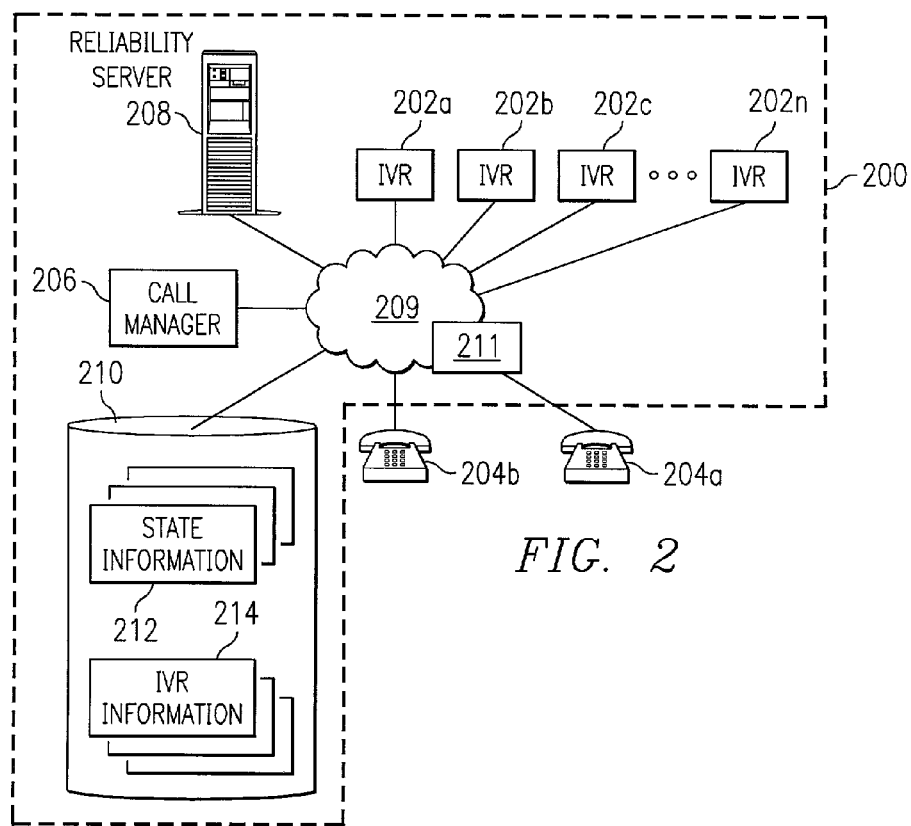
FIG. 2 illustrates a particular embodiment of a communication system that recovers a communication session after failure of an interactive voice response server.

FIG. 2 shows a particular embodiment of a system 200 that processes calls for a call servicing center. System 200 allows the user of endpoint 204 to connect to an interactive voice response (IVR) server 202 through a network 209, which is substantially equivalent to network 102 of FIG. 1. Endpoint 204 may connect to network 209 directly (shown by endpoint 204b) or may connect from the PSTN using gateway 211. IVR 202 prompts the user of system 200 for information, receives voice information or another suitable form of input from the user, and retrieves and/or stores information in response to commands from the user. IVR 202 includes hardware and/or software and may include processors, interfaces, memory modules, or any other suitable component.

When IVR 202a fails during a communication session, it is inefficient to require the user to redial or otherwise manually reconnect to system 200. Instead, system 200 allows a communication session to be transferred automatically to a second IVR 202b, so that the user does not have to redial the same number if the first IVR 202a fails. In certain embodiments, the state of the caller in the first IVR 202a is preserved so that the caller does not have to re-enter information that was entered before IVR 202a failed, such as an account number or a Social Security number. A technical advantage of certain embodiments of system 200 is that the transfer can be performed automatically and seamlessly, so that the user is not even aware that IVR 202a has failed. Alternatively, system 200 may play a prompt to the user indicating that IVR 202a failed, and that corrective measures are being taken.

Call manager 206 manages connections between endpoint 204 and IVR 202, and represents any hardware and/or software suitable for call processing in system 200. Call manager 206 is also capable of transferring a connection with endpoint 204 from one IVR 202a to another IVR 202b when IVR 202a fails. Reliability server 208 monitors keep alive signals from IVRs 202, and may be embodied as a form of hardware and/or software suitable to receive keep alive signals, to monitor the keep alive signals, and to send messages to call manager 206 if the keep alive signals should be interrupted. Although labeled as a "server," reliability server 208 may be implemented in any network architecture, and may be distributed in other components of system 200. For example, a backup IVR 202b could monitor the activity of IVR 202a and take over a connection when IVR 202a fails.

Memory 210 stores state information 212 and status information 214 for IVRs 202. Memory 210 may be any form of information storage, including read only memory (ROM), random access memory (RAM), CD-ROMs, DVD-ROMs, magnetic media, optical media, volatile memory, nonvolatile memory, or any other suitable local or remote memory component. Memory 210 may be part of reliability server 107, or may be any other storage accessible by components of system 200. State information 212 includes state information for calls in system 200 that allows call manager 206 to transfer a communication with endpoint 204 from failed IVR 202a to alternate IVR 202b. IVR information 214 lists the availability of various IVRs 202 in system 200 to process calls. IVR information 214 is used by call manager 206 to identify an available IVR 202b when an IVR 202a in a communication session with endpoint 204 fails. IVR information 214 may also include status information regarding the progress of a call between IVR 202 and endpoint 204, which may include previous answers submitted by the caller to IVR 202.

In operation, reliability server 208 monitors keep alive signals received from IVRs 202. Endpoint 204 communicates with IVR 202a and exchanges information with IVR 202a. If IVR 202a fails, reliability server 208 detects an interruption in the keep alive signals. Reliability server 208 then notifies call manager 206 that IVR 202a has failed. Reliability server 208 instructs call manager 206 to determine another available IVR 202b using IVR information 214. Reliability server 208 then instructs call manager 206 to establish a connection between IVR 202b and endpoint 204 automatically using state information 212 and/or other information collected and stored during the communication session between endpoint 204 and IVR 202a. This allows the connection with endpoint 204 to continue substantially uninterrupted. This saves the user of endpoint 204 from having to reestablish a connection with IVR 202 and re-enter information.

Numerous modifications and replacements of components of system 200 may be made without substantially affecting the overall functioning of system 200. For example, call manager 206 may perform the functions of reliability server 208 as well. Different or additional components may be included in system 200 as well, such automatic call distributors (ACDs) in addition to, or in place of, IVRs 202. System 200 should therefore be viewed as an illustrative example of using recovery techniques for communication sessions rather than as an exclusive definition.

FIG. 3 is a flowchart 300 showing one example of a method for recovering a communication session after endpoint failure. System 100 establishes a communication connection between endpoints 104a and 104b at step 302. At step 304, system 100 monitors keep alive signals from endpoint 104a. System 100 determines if system 100 is still receiving keep alive signals from endpoint 104a at step 306. If system 100 is still receiving keep alive signals, system 100 continues to monitor the keep alive signals at step 304. If system 100 has detected an interruption in the keep alive signals, system 100 determines whether it has received a termination message indicating that the communication session was ended voluntarily, at step 308. If system 100 received a termination message, system 100 ends the communication at step 310. In certain embodiments of system 100, endpoints 104 may continue to send keep alive signals to indicate that endpoints 104 are available for calls even when there is no active call with an endpoint 104. In such embodiments, system 100 may receive a termination message without an interruption in keep alive signals.

If there has been an interruption in keep alive signals that is not associated with a termination message, system 100 maintains the connection with active endpoint 104b, at step 312. System 100 saves state information for the communication session at step 314. The state information is later used to transfer or to reestablish the communication session. System 100 notifies active endpoint 104b that failed endpoint 104a is experiencing difficulty at step 316, and sends a message to failed endpoint 104a instructing the endpoint to reboot at step 318.

System 100 waits for a predetermined period of time after the reboot message is sent, monitoring for keep alive signals from endpoint 104a to resume at step 320. At step 322, system 100 determines whether any keep alive signals were received during the predetermined time period. If keep alive signals were received, system 100 reestablishes the existing connection between endpoints 104a and 104b at step 324 and monitors keep alive signals in the reestablished communication session at step 304. If no keep alive signals were received, system 100 retrieves directory information at step 326. System 100 selects an alternate endpoint 104c using the directory information at step 328, and transfers the communication session with active endpoint 104b from failed endpoint 104a to alternate endpoint 104c at step 330. Once this communication connection is established, system 100 monitors keep alive signals from the endpoint 104c and proceeds with the method as before from step 304.

The method described is only one example of recovering a communication session after endpoint failure. Alternative methods are available, and various steps of the method presented may be omitted, rearranged and/or performed concurrently or continuously without substantially affecting the overall operation of the method. Consequently, the method presented should be viewed as an example, rather than as the only possible method for recovering a communication session after endpoint failure.

Although particular embodiments of the present invention have been described, a myriad of modifications, improvements, and variations are possible for one skilled in the art without departing from the spirit of the present invention. It is intended that the present invention include all such modifications, improvements, and variations as are included in the scope of the appended claims.

What is claimed is:

1. A method for recovering a communication session after failure of an endpoint, comprising:
  establishing a communication session between a first user endpoint and a second user endpoint;
  receiving keep alive signals from the first user endpoint;
  detecting an interruption in the keep alive signals;
  maintaining a connection with the second user endpoint after the interruption;
  determining that the interruption in keep alive signals resulted from failure of the first user endpoint by failing to receive a termination message, the termination message indicating that the communication session was ended voluntarily;
  reestablishing the communication session between the first user endpoint and the second user endpoint if the keep alive signals resume within a predetermined time period; and
  transferring the communication session with the second endpoint from the first endpoint to a third endpoint if the keep alive signals do not resume within the predetermined time period.

2. The method of claim 1, further comprising:
  notifying the second endpoint that the first endpoint has failed; and
  communicating a message to the first endpoint instructing the first endpoint to reboot.

3. The method of claim 1, wherein:
  the first endpoint is associated with a user in a directory relating a plurality of users to a plurality of endpoints;
  the third endpoint is also associated with the user in the directory; and
  the method further comprises:
    determining the user associated with the first endpoint using the directory; and
    determining that the third endpoint is also associated with the user.

4. The method of claim 1, wherein the third endpoint is a voice mail system associated with a user of the first endpoint.

5. A method for recovering a communication session after failure of an endpoint, comprising:
  establishing a communication session between a first user endpoint and a second user endpoint, the first endpoint associated with a first user and the second endpoint associated with a second user;
  receiving keep alive signals from the first user endpoint;
  detecting an interruption in the keep alive signals from the first user endpoint;
  maintaining a connection with the second user endpoint after the interruption;
  identify a third user endpoint as being associated with the first user; and
  transferring the communication session with the second user endpoint from the first user endpoint to the third user endpoint.

6. The method of claim 5, wherein:
  the first user endpoint further comprises a reset button; and
  the first user endpoint is further operable to stop communicating the keep alive signals in response to a user pressing the reset button.

7. The method of claim 5, wherein the first and third user endpoints are interactive voice response (IVR) servers.

8. The method of claim 7, further comprising:
  storing status information for the first user endpoint; and
  using the status information to resume the communication session with the third user endpoint from approximately a point at which the interruption in keep alive signals was detected.

9. A method for recovering a communication session after failure of an endpoint, comprising:
  establishing a communication session between a first user endpoint and a second user endpoint, wherein
  receiving keep alive signals from the first user endpoint;
  detecting an interruption in the keep alive signals from the first user endpoint;
  maintaining a connection with the second user endpoint after the interruption;
  transferring the communication session with the second user endpoint from the first user endpoint to a third user endpoint
  wherein:
    the first user endpoint is associated with a user in a directory relating a plurality of users to a plurality of endpoints;
    the third user endpoint is also associated with the user in the directory; and
  wherein the method further comprises:
    determining the user associated with the first user endpoint using the directory;
    determining that the third user endpoint is also associated with the user; and
    selecting the third user endpoint for the communication session.

10. A method for reestablishing a communication session, comprising:
  establishing a communication session between a first user endpoint and a second user endpoint;
  receiving from a user of the first user endpoint a user-generated message to reestablish the communication session; and
  in response to the user-generated message, reestablishing the communication session between the second user endpoint and the user of the first endpoint, the reestablishing comprising:
    instructing the first endpoint to reset;
    waiting a predetermined period of time for the first endpoint to reset; and
    reestablishing the communication session between the first endpoint and the second endpoint if the first endpoint successfully resets during the predetermined period of time.

11. The method of claim 10, wherein the step of reestablishing comprises transferring the communication session with the second endpoint from the first endpoint to a third endpoint associated with the user of the first endpoint.

12. The method of claim 10, wherein the step of reestablishing further comprises transferring the communication session with the second endpoint from the first endpoint to a third endpoint associated with the user of the first endpoint if the first endpoint does not successfully reset within the predetermined period of time.

13. The method of claim 10, wherein the steps are performed by logic embodied in a computer readable medium.

14. A communication device, comprising:
an interface operable to receive keep alive signals from a first user endpoint in a communication session with a second user endpoint; and
a processor operable to:
   detect an interruption in the keep alive signals;
   maintain a connection with the first user endpoint after the interruption;
   determine that the interruption in keep alive signals resulted from failure of the first user endpoint by failing to receive a termination message, the termination message indicating that the communication session was ended voluntarily;
   reestablish the communication session if the keep alive signals resume within a predetermined time period; and
   transfer the communication session with the second endpoint from the first endpoint to a third endpoint if the keep alive signals do not resume within the predetermined time period.

15. The communication device of claim 14, wherein the communication device comprises a call manager.

16. The communication device of claim 14, wherein the communication session comprises a point-to-point communication session.

17. The communication device of claim 16, wherein the point-to-point communication session is established using Session Initiation Protocol (SIP) or H.323.

18. The communication device of claim 14, wherein transferring the communication session comprises:
   determining an alternate endpoint associated with a user of the first endpoint; and
   communicating a message to a call manager instructing the call manager to establish the communication session between the second endpoint and the alternate endpoint.

19. The communication device of claim 14, wherein transferring the communication session comprises:
   determining an alternate endpoint associated with a user of the first endpoint; and
   communicating a message to the alternate endpoint instructing the alternate endpoint to reestablish the communication session with the first endpoint.

20. The communication device of claim 14, wherein:
   the first endpoint is coupled to a transport control protocol/Internet protocol (TCP/IP) network;
   the communication device is coupled to the TCP/IP network; and
   the keep alive signals comprise TCP/IP signaling information.

21. The communication device of claim 14, wherein:
   the first endpoint is coupled to an Internet protocol (IP) network carrying packets over User Datagram Protocol (UDP);
   the communication device is coupled to the IP network; and
   the keep alive signals comprise UDP signaling information.

22. The communication device of claim 14, wherein:
   the first endpoint comprises a voice-over-IP (VoIP) telephone; and
   the third endpoint comprises a cellular telephone associated with a user of the VoIP telephone.

23. A communication device, comprising:
an interface operable to receive keep alive signals from a first user endpoint in a communication session with a second user endpoint; and
a processor operable to:
   detect an interruption in the keep alive signals from the first user endpoint, the first endpoint associated with a first user and the second endpoint associated with a second user;
   maintain a connection with the second user endpoint after the interruption;
   identify a third user endpoint as being associated with the first user; and
   transfer the communication session with the second user endpoint to the third user endpoint.

24. The communication device of claim 23, wherein the first and third user endpoints are interactive voice response servers (IVRs).

25. The communication device of claim 23, wherein the processor is further operable to:
   store status information for the first user endpoint; and
   use the status information to resume the communication session with the third user endpoint from approximately a point at which the interruption in keep alive signals was detected.

26. The communication device of claim 23, wherein:
   the first user endpoint is coupled to a transport control protocol/Internet protocol (TCP/IP) network;
   the communication device is coupled to the TCP/IP network; and
   the keep alive signals comprise TCP/IP signaling information.

27. The communication device of claim 23, wherein:
   the first user endpoint is coupled to an Internet protocol (IP) network carrying packets over User Datagram Protocol (UDP); and
   the keep alive signals comprise UDP signaling information.

28. The communication device of claim 23, wherein the processor is further operable to transfer the communication session automatically in response to a message from the first user endpoint.

29. Logic embodied in a computer readable medium operable to perform the steps of:
   establishing a communication session between a first user endpoint and a second user endpoint;
   receiving keep alive signals from the first user endpoint;
   detecting an interruption in the keep alive signals;
   maintaining a connection with the second user endpoint after the interruption;
   determining that the interruption in keep alive signals resulted from failure of the first user endpoint by failing to receive a termination message, the termination message indicating that the communication session was ended voluntarily;
   reestablishing the communication session between the first user endpoint and the second user endpoint if the keep alive signals resume within a predetermined time period; and
   transferring the communication session with the second endpoint from the first endpoint to a third endpoint if the keep alive signals do not resume within the predetermined time period.

30. The logic of claim 29, wherein the logic is further operable to perform the steps of:

notifying the second endpoint that the first endpoint has failed; and communicating a message to the first endpoint instructing the first endpoint to reboot.

31. The logic of claim 29, wherein:

the first endpoint is associated with a user in a directory relating a plurality of users to a plurality of endpoints;

the third endpoint is also associated with the user in the directory; and the logic is further operable to perform the steps of:

determining the user associated with the first endpoint using the directory; and determining that the third endpoint is also associated with the user.

32. Logic embodied in a computer readable medium operable to perform the steps of:

establishing a communication session between a first user endpoint and a second user endpoint;

receiving keep alive signals from the first user endpoint, the first endpoint associated with a first user and the second endpoint associated with a second user;

detecting an interruption in the keep alive signals from the first user endpoint;

maintaining a connection with the second user endpoint after the interruption;

identifying a third user endpoint as being associated with the first user; and transferring the communication session with the second user endpoint from the first user endpoint to the third user endpoint.

33. The logic of claim 32, wherein:

the first user endpoint is associated with a user in a directory relating a plurality of users to a plurality of endpoints;

the third user endpoint is also associated with the user in the directory; and the logic is further operable to perform the steps of:

determining the user associated with the first user endpoint using the directory;

determining that the third user endpoint is also associated with the user.

34. The logic of claim 32, wherein:

the first and third user endpoints are interactive voice response servers (IVRs); and the logic is further operable to perform the steps of:

storing status information about the first user endpoint; and using the status information to resume the communication session from approximately a point at which the interruption in keep alive signals was detected.

35. A system for recovering a communication session after failure of an endpoint, comprising:

means for establishing a communication session between a first user endpoint and a second user endpoint, the first endpoint associated with a first user and the second endpoint associated with a second user;

means for receiving keep alive signals from the first user endpoint;

means for detecting an interruption in the keep alive signals from the first user endpoint;

means for maintaining a connection with the second user endpoint after the interruption;

means for identifying a third user endpoint as being associated with the first user; and means for transferring the communication session with the second user endpoint to the third user endpoint.

\* \* \* \* \*